United States Patent
Challita et al.

(10) Patent No.: US 12,395,981 B2
(45) Date of Patent: Aug. 19, 2025

(54) SCHEDULING ENHANCED MOBILE BROADBAND TRANSMISSIONS

(71) Applicant: Telefonaktiebolaget LM Ericsson (publ), Stockholm (SE)

(72) Inventors: Ursula Challita, Solna (SE); Kimmo Hiltunen, Esbo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 483 days.

(21) Appl. No.: 17/774,026

(22) PCT Filed: Nov. 7, 2019

(86) PCT No.: PCT/SE2019/051124
§ 371 (c)(1),
(2) Date: May 3, 2022

(87) PCT Pub. No.: WO2021/091442
PCT Pub. Date: May 14, 2021

(65) Prior Publication Data
US 2022/0394736 A1    Dec. 8, 2022

(51) Int. Cl.
*H04W 72/12* (2023.01)
*H04L 5/14* (2006.01)
(Continued)

(52) U.S. Cl.
CPC ....... *H04W 72/1263* (2013.01); *H04L 5/1469* (2013.01); *H04W 28/0942* (2020.05); *H04W 72/542* (2023.01)

(58) Field of Classification Search
CPC ......... H04W 72/1263; H04W 28/0942; H04W 72/542; H04W 28/0236; H04W 36/20;
(Continued)

(56) References Cited

U.S. PATENT DOCUMENTS 11,595,948 B2 *  2/2023  Chen ................... H04W 16/14
2018/0027576 A1 *  1/2018  Kowalski .............. H04W 72/56
370/329
(Continued)

FOREIGN PATENT DOCUMENTS

CN      109561504 A    4/2019
GB      2562120 A    11/2018
(Continued)

OTHER PUBLICATIONS

Bairagi, Anupam Kumar, et al., "A Matching Based Coexistence Mechanism between eMBB and uRLLC in 5G Wireless Networks", SAC '19: Proceedings of the 34th ACM/SIGAPP Symposium on Applied Computing, Apr. 2019, pp. 2377-2384.
(Continued)

*Primary Examiner* — Shukri Taha
(74) *Attorney, Agent, or Firm* — Murphy, Bilak & Homiller, PLLC (57) ABSTRACT

In a method in a node of a communications network for scheduling enhanced mobile-broadband, eMBB, transmissions, the eMBB coverage area interferes with an ultra-reliable low latency communication network, URLLC. In a first block (302) a time division duplex, TDD, pattern for the URLLC is predicted based on historical URLLC TDD data. In a second block (304) an eMBB TDD pattern is scheduled, based on the predicted URLLC TDD pattern, so as to manage cross-link interference on the URLLC network.

21 Claims, 6 Drawing Sheets

(51) Int. Cl.
  *H04W 28/08* (2023.01)
  *H04W 72/1263* (2023.01)
  *H04W 72/542* (2023.01)

(58) Field of Classification Search
  CPC ............... H04W 40/16; H04W 72/541; H04W 74/0825; H04W 74/085; H04L 5/1469
  See application file for complete search history.

(56) References Cited

U.S. PATENT DOCUMENTS

| | | | | |
|---|---|---|---|---|
| 2018/0092081 A1* | 3/2018 | Chen | ...................... | H04W 16/14 |
| 2019/0045546 A1* | 2/2019 | Li | ......................... | H04L 5/0073 |
| 2019/0327757 A1* | 10/2019 | Oteri | ..................... | H04L 5/0053 |

FOREIGN PATENT DOCUMENTS

| | | | |
|---|---|---|---|
| KR | 20180108940 A | 10/2018 | |
| WO | 2018111571 A1 | 6/2018 | |
| WO | 2018126934 A1 | 7/2018 | |
| WO | 2018129325 A1 | 7/2018 | |
| WO | 2018175420 A1 | 9/2018 | |
| WO | 2019010697 A1 | 1/2019 | |

OTHER PUBLICATIONS

Challita, Ursula, et al., "Performance Evaluation for the Co-existence of eMBB and URLLC Networks: Synchronized versus Unsynchronized TDD", https://arxiv.org/ftp/arxiv/papers/1906/1906.00287.pdf, IEEE Conference Paper, 2019, pp. 1-6.
CMCC, "UE behaviour related to dynamic and semi-static configured resources", 3GPP TSG RAN WG1 NR Ad-Hoc#2, R1-1710781, Qingdao, P.R. China, Jun. 27-30, 2017, pp. 1-3.
Ding, Ming, et al., "Small Cell Dynamic TDD Transmissions in Heterogeneous Networks", IEEE ICC 2014—Wireless Communications Symposium, 2014, pp. 4881-4887.
Fan, Qiang, et al., "Resource Allocation in Dynamic TDD Heterogeneous Networks under Mixed Traffic", arXiv:1608.06754v1 [cs.NI], Aug. 24, 2016, pp. 1-12.
Institute for Information Industry (III), "Uplink Pre-emption for URLLC Reliability", 3GPP TSG RAN WG1 Meeting #92bis, R1-1804450, Sanya, China, Apr. 16-20, 2018, pp. 1-3.
Popovski, Petar, et al., "5G Wireless Network Slicing for eMBB, URLLC, and mMTC: A Communication—Theoretic View", Digital Object Identifier, IEEE Access, vol. 6, 2018, pp. 55765-55779.
Samsung, "Cross-link interference management based on coordinated beamforming", 3GPP TSG RAN WG1 Meeting NR#3, R1-1716036, Nagoya, Japan, Sep. 18-21, 2017, pp. 1-12.
Unknown, Author, "Intra-UE multiplexing and prioritization between mixed traffic priorities", 3GPP TSG RAN WG1 Meeting #96, R1-1901828, Athens, Greece, Feb. 25-Mar. 1, 2019, 1-5.

* cited by examiner

SCHEDULING ENHANCED MOBILE BROADBAND TRANSMISSIONS

TECHNICAL FIELD

This disclosure relates to methods, nodes and systems in a communications network for scheduling enhanced mobile-broadband (eMBB) transmissions. More particularly but non-exclusively, the disclosure relates to scheduling eMBB transmissions so as to manage cross-link interference on an ultra-reliable low latency communication URLLC network.

BACKGROUND

Fifth generation (5G) mobile networks are envisioned to feature different service classes including ultra-reliable low-latency communications (URLLC), massive machine type communications (mMTC), and enhanced mobile broadband (eMBB). eMBB aims at high spectral efficiency, whilst for URLLC applications, hard latency (e.g., 1 ms) and reliability requirements (target Block Error Rates (BLER) between $10^{-5}$ and $10^{-9}$) are specified. URLLC and eMBB networks are described in the paper by P. Popovski et al. (2018) entitled: "5G Wireless Network Slicing for eMBB, URLLC, and mMTC: A Communication-Theoretic View", IEEE Access, vol. 6, pp. 55765-55779, September 2018.

The stringent latency and reliability requirements of URLLC enable new emerging use cases such as factory automation, drone communication, remote control, and remote surgery. An important use case for URLLC is factory automation which may have, for example, required latency of less than 1 ms and reliability requirements of 99.999%.

SUMMARY

For 5G use cases such as factory automation (or any other "critical" application), the local URLLC network (e.g. factory) may be overlain by a macro network offering wide area coverage in the same, or neighboring, frequency band. Such macro networks may interfere with the local network, reducing the local network's ability to meet the URLLC latency and reliability requirements.

In particular, in some scenarios of unsynchronized time division duplex (TDD), the macro and the local factory network may follow different TDD patterns (e.g. different patterns of uplink and downlink transmissions as described in more detail below). For example, the macro network may follow an eMBB-optimized TDD pattern while the local factory network follows an URLLC-optimized TDD pattern. This can mean the eMBB network transmits in the uplink/downlink whilst the URLLC network is transmitting in the downlink/uplink respectively.

As such, base stations in the URLLC network may intermittently experience interference from transmissions from neighboring high-power macro base stations forming part of the eMBB network and having over-lapping coverage areas. This is known as cross-link interference between the base stations, and can have a serious negative impact on the uplink URLLC service availability. More precisely, the latency and reliability requirements of the URLLC users may not be met at different locations within the factory, thus limiting the performance of the factory automation.

It is an object of embodiments herein to address some of these issues. Thus according to a first embodiment herein, there is a method in a node of a communications network for scheduling enhanced mobile-broadband, eMBB, transmissions in scenarios where the eMBB coverage area overlaps with an ultra-reliable low latency communication (URLLC) network. The method comprises predicting a time division duplex, TDD, pattern for the URLLC based on historical URLLC TDD data, and scheduling an eMBB TDD pattern, based on the predicted URLLC TDD pattern, so as to manage cross-link interference on the URLLC network.

As will be described in more detail below, in some embodiments the method may further comprise predicting a traffic load for the eMBB based on historical eMBB traffic load data. The step of scheduling may thus comprise scheduling the eMBB TDD pattern based on the predicted URLLC TDD pattern and the predicted eMBB traffic load.

By using historical data to predict a future TDD pattern for the URLLC, the eMBB node may schedule its transmissions to minimize cross-link interference and thus enable the URLLC network to meet its latency and reliability requirements. URLLC network reliability is essential for applications such as automated factories and/or automated or remote surgery, enabling these technologies to be implemented in a safe and reliable manner.

In some embodiments the step of predicting a time division duplex, TDD, pattern for the URLLC based on historical URLLC TDD data may comprise predicting, at a time, t, the time division duplex, TDD, pattern for the URLLC over a future time interval, (t;t+s), wherein s comprises the duration of the future time interval, and wherein the prediction is based on historical URLLC TDD data obtained in a past time interval (t–k;t), wherein k comprises the duration of the past time interval.

In some embodiments the step of scheduling an eMBB TDD pattern may comprise: at the time t, allocating future eMBB TDD patterns over the future time interval (t;t+s), based on the predicted URLLC TDD pattern over the future time interval (t;t+s) and the predicted eMBB traffic load over the future time interval (t;t+s).

In some embodiments the step of scheduling may comprise scheduling the eMBB TDD pattern so as to meet a service level requirement associated with the URLLC.

In some embodiments the step of scheduling may comprise: minimising a number of slots in which the eMBB transmits in the downlink whilst the URLLC is predicted to transmit in the uplink; and/or minimising a number of slots in which the eMBB transmits in the uplink whilst the URLLC is predicted to transmit in the downlink.

In some embodiments the step of scheduling may comprise: scheduling an eMBB uplink slot during a predicted URLLC uplink slot; or scheduling an eMBB downlink slot during a predicted URLLC downlink slot.

In some embodiments the step of scheduling may comprise: refraining from scheduling an eMBB downlink slot during a predicted URLLC uplink slot; or scheduling an eMBB downlink slot during a predicted URLLC uplink slot only if required by the eMBB network to meet a service level requirement associated with the eMBB.

In some embodiments the step of scheduling may comprise: scheduling an eMBB uplink slot during a predicted URLLC downlink slot for a subset of devices connected to the eMBB network, wherein the subset of devices are located such that the crosslink interference caused by uplink from the subset of devices on the downlink of the URLLC is below a threshold interference level. In some embodiments the threshold interference level may be set based on the signal strength of the subset of devices as measured in the URLLC network.

In some embodiments the step of scheduling may comprise: refraining from scheduling an eMBB slot during a predicted URLLC uplink or downlink slot, based on: an amount of downlink data in the buffer; a downlink latency requirement of the eMBB network; and/or an average bit rate requirements of the eMBB.

In some embodiments the node applies beamforming, and the step of scheduling may comprise: scheduling the eMBB TDD pattern of beams overlapping a coverage area of the URLLC with a strength above a threshold signal strength, based on the predicted URLLC TDD pattern.

In some embodiments, the step of scheduling may comprise adjusting a numerology associated with the TDD pattern of the eMBB so as to synchronise at least one slot in the TDD pattern of the eMBB with at least one slot in the TDD pattern of the URLLC.

In some embodiments, the step of scheduling may comprise adjusting a sub-slot scheduling scheme of the eMBB so as to synchronise at least one slot or sub-slot in the TDD pattern of the eMBB with at least one slot or sub-slot in the TDD pattern of the URLLC.

In some embodiments, the step of scheduling may comprise leaving at least one slot or symbol of the eMBB TDD pattern unutilised so as to manage cross-link interference on a slot or sub-slot of the URLLC.

In some embodiments the step of predicting may comprise: training a first model to predict the URLLC TDD pattern using a machine learning process. In some embodiments the first model comprises a recurrent neural network. In some embodiments the first model may take as input one or more of: a time of day; a day of the week; a previous URLLC pattern; a URLLC load; and an estimate of a future load and/or TDD pattern provided by the URLLC network.

In some embodiments training the first model may comprise training the model on training data comprising i) example inputs and ii) corresponding ground truth URLLC TDD patterns. In some embodiments the method may comprise determining a ground truth URLLC TDD pattern based on interference experienced by the eMBB network from the URLLC network. In some embodiments the URLLC and the eMBB may be operated by different network operators.

In some embodiments the method may further comprise receiving a signal from the URLLC network, the signal comprising an indication of an example input and/or an example corresponding ground truth URLLC TDD pattern. In some embodiments the URLLC network and the eMBB network may be operated by the same network operator.

In some embodiments the step of predicting traffic load for the eMBB may comprise training a second model to predict the traffic load for the eMBB using a machine learning process. In some embodiments the second model may comprise a recurrent neural network. In some embodiments the second model may take as input one or more of: a time of day; a day of the week; a historical traffic load of the node associated with the eMBB; and a historical traffic load associated with another node neighbouring the node associated with the eMBB.

According to a second aspect there is a node in a communications network, wherein the node is configured for enhanced mobile-broadband, eMBB, transmission with a coverage area that interferes with an ultra-reliable low latency communication network, URLLC. The node comprises: a memory comprising instruction data representing a set of instructions, and a processor configured to communicate with the memory and to execute the set of instructions. The set of instructions, when executed by the processor, cause the processor to: predict a time division duplex, TDD, pattern for the URLLC based on historical URLLC TDD data; and schedule an eMBB TDD pattern, based on the predicted URLLC TDD pattern, so as to manage cross-link interference on the URLLC network.

In some embodiments the processor may be further caused to: predict traffic load for the eMBB based on historical eMBB traffic load data. In some embodiments being caused to schedule may comprise the processor being caused to schedule the eMBB TDD pattern based on the predicted URLLC TDD pattern and the predicted eMBB traffic load.

In some embodiments the node comprises one of: a base station; an evolved NodeB; or a network function in a 5G network.

In some embodiments the node is configured to perform the method of the first aspect.

According to a third aspect there is a computer program product comprising a computer readable medium, the computer readable medium having computer readable code embodied therein, the computer readable code being configured such that, on execution by a suitable computer or processor, the computer or processor is caused to perform the method of the first aspect.

BRIEF DESCRIPTION OF THE DRAWINGS

For a better understanding and to show more clearly how embodiments herein may be carried into effect, reference will now be made, by way of example only, to the accompanying drawings, in which.

DETAILED DESCRIPTION

Ultra-reliable low-latency communication (URLLC) networks such as those used in automated factory settings, or for automated surgery or similar, may suffer interference from overlying macro networks. Such cross-link interference may result in the URLLC network being unable to meet its latency or reliability requirements. It is an object of embodiments herein to address such issues.

In the frequency domain, User Equipments (UEs) and/or devices are dynamically multiplexed by the orthogonal frequency division multiple access. As will be familiar to the skilled person, in time division duplex (TDD), transmissions over the communications network are divided into slots which are allocated to uplink or downlink transmissions. TDD may be performed over a repeating cycle of uplink and downlink slots, the pattern of which is referred to as the TDD pattern. Each slot in the TDD pattern comprises 14 symbols, each symbol comprising one or more bits of information. The length or duration of the slot depends then on the chosen numerology. A high numerology, i.e., a short slot duration may be seen as an option to improve latency in 5G NR. As another latency enhancement, a concept of non-slot-based transmissions have been introduced as well, which is here referred to as sub-slot-based scheduling. In case of sub-slot-based scheduling, short transmissions comprising 2, 4 or 7 symbols for downlink and any number of symbols less than 14 for uplink are possible. These short transmissions can start and end in any symbol within a slot.

Figure 1:
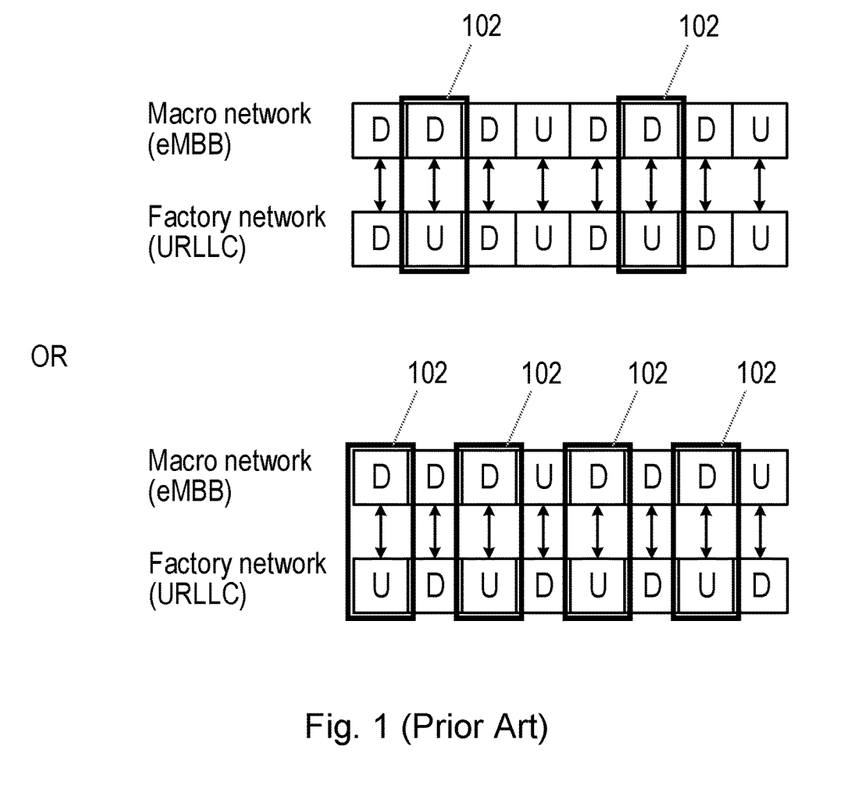
FIG. 1 illustrates two prior art examples of unsynchronized TDD patterns between an eMBB and a URLLC.

FIG. 1 shows two examples of pairs of transmissions that illustrate unsynchronized TDD patterns. In these examples, each block (labelled "D" for downlink or "U" for uplink) represents a slot 102. Each sequence of four slots (e.g. DDDU and DUDU for the eMBB and URLLC respectively) represent a TDD pattern 104.

In the upper example, the eMBB-optimized TDD pattern is "DDDU" while the URLLC-optimized TDD pattern is "DUDU". Cross-link interference occurs during the blocks highlighted by reference numeral 106, whereby the eMBB and URLLC are unsynchronized with one performing downlink whilst the other performs uplink.

In another example, as shown in the lower example in FIG. 1, the eMBB network may follow a DDDU TDD pattern while a local factory (URLLC network) follows a DUDU TDD pattern. This also results in cross link interference in the blocks 106.

Generally, as shown in the scenarios shown in FIG. 1, a high level of uplink interference may be seen on the URLLC network when the eMBB network is transmitting in the downlink (as highlighted by the boxes in FIG. 1). This in turn can result in performance degradation of the URLLC network leading to a scenario where latency and reliability requirements cannot be achieved and thus applications of the URLLC network (e.g. factory automation remote surgery etc) are no longer feasible.

Figure 2:
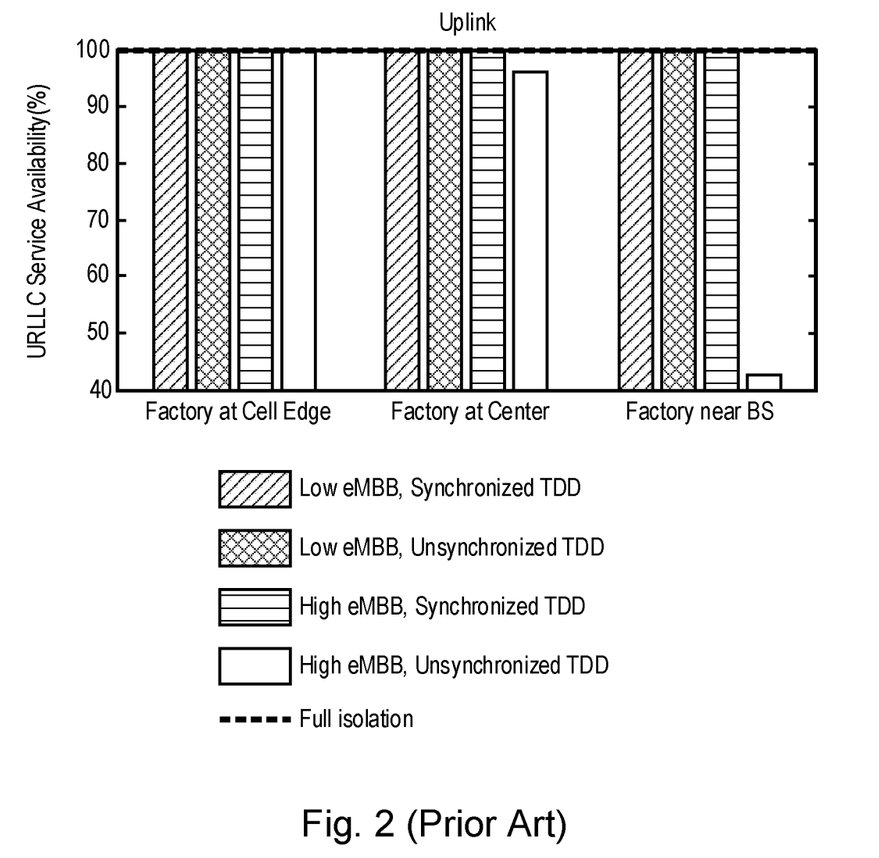
FIG. 2 is a graph illustrating interference experienced by a URLLC network at different locations in relation to an eMBB network.

FIG. 2 shows example URLLC service availability for the case of synchronized (where both networks follow a DUDU TDD pattern) and unsynchronized TDD for different factory locations relative to a neighboring macro cell. In the Figure "Low eMBB" refers to a traffic load of 100 Mbps/km$^2$ and "High eMBB" refers to a traffic load of 300 Mbps/km$^2$. It can be clearly shown that the URLLC service availability decreases in the case of unsynchronized TDD, and as the factory gets closer to a macro base station, e.g. closer to the center of the macro cell. This is the result of high-power eMBB downlink transmissions during the URLLC uplink transmissions. More information on this may be found in the paper by Challita et al. entitled: "Performance Evaluation for the Co-existence of eMBB and URLLC Networks: Synchronized versus Unsynchronized TDD"; available at: https://arxiv.org/ftp/arxiv/papers/1906/1906.00287.pdf.

Figure 3:
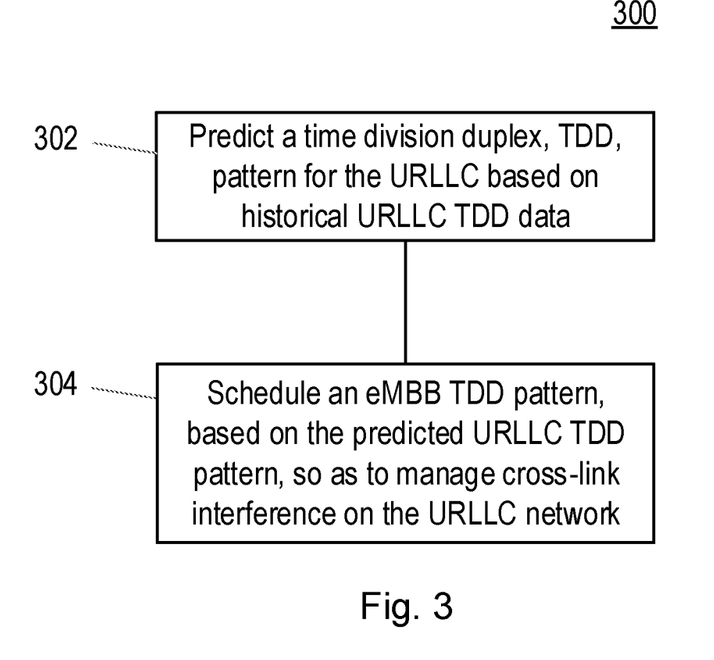
FIG. 3 illustrates a method according to some embodiments herein.

To address this issue, FIG. 3 illustrates an example method 300 according to some embodiments herein. The method 300 may be performed by a node in a communications network that is for (e.g. configured or suitable for) scheduling enhanced mobile-broadband, eMBB, transmissions. In scenarios where the coverage area of the eMBB cell or beam interferes with an ultra-reliable low latency communication network, URLLC, the method 300 may be used to manage cross-link interference on the URLLC network. Briefly, in a block 302 the method 300 comprises predicting a time division duplex, TDD, pattern for the URLLC based on historical URLLC TDD data. Then in a block 304 the method comprises scheduling an eMBB TDD pattern, based on the predicted URLLC TDD pattern, so as to manage cross-link interference on the URLLC network.

One of the realisations that led to the proposed methods and systems herein is that eMBB traffic is typically "best-effort", e.g., flexible or less latency critical compared to URLLC traffic. Therefore, once the URLLC TDD pattern is predicted, the eMBB traffic is flexible so that it may, for example, be buffered or otherwise scheduled to avoid eMBB downlink transmissions being transmitted in URLLC uplink, or eMBB uplink transmission in URLLC downlink. The idea is to avoid scheduling TDD patterns in a manner that would result in cross-link interference as much as possible, e.g., whenever made possible by the load in the eMBB macro cells. This may be used for example, to minimise the impact of the downlink transmission of the macro base stations on the uplink URLLC transmissions of a factory. Thus increasing (preferably optimising or maximising) the URLLC service availability within the factory, e.g., maximize the percentage of locations within the factory floor where the desired quality of service (QoS) can be guaranteed while also meeting the quality of service for eMBB users.

In more detail, generally the communications network (or telecommunications network) may comprise any combination of wired or wireless links. In some embodiments, the communications network may be configured to operate according to specific standards or other types of predefined rules or procedures. Thus, particular embodiments of the communications network may implement communication standards, such as Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Generally, the node may comprise any component or network function (e.g. any hardware or software module) in the communications network suitable for performing the method 300. In some embodiments the node may comprise the node 600 as described with respect to FIG. 6 below. Generally, for example, the node may be involved in resourse orchestration an scheduling transmissions/TDD patterns for the eMBB network.

Examples of nodes include, but are not limited to, access points (APs) (e.g., radio access points), base stations (BSs) (e.g., radio base stations, Node Bs, evolved Node Bs (eNBs) and NR NodeBs (gNBs)). Further examples of nodes include but are not limited to core network functions such as, for example, core network functions in a Fifth Generation Core network (5GC). Examples of 5GC network functions include, but are not limited to the Access and Mobility Management function (AMF), Session Management function (SMF) and Network Slice Selection Function (NSSF).

The node may be configured for making eMBB transmissions, e.g. the method 300 may be used by the node to schedule its own eMBB transmissions. Alternatively, the node may be configured to communicate with another node, the other node being configured to perform the scheduled transmissions, e.g. the node may use the method 300 to schedule the eMBB transmissions of another node.

eMBB transmissions may comprise transmissions that comply with the 3GPP New Radio (NR) standard.

The URLLC may be associated with, for example, a factory (e.g. a "smart factory") for performing factory automation; drone communication for navigating drones; automated vehicles; and/or remote surgery applications. The skilled person will appreciate however that these are only examples, and that the URLLC may be associated with any other application.

Generally the URLLC network may comply with the 3GPP New Radio (NR) standard.

Generally, transmissions made by the eMBB may interfere with transmissions of a URLLC. As such, the coverage area of the node performing the eMBB transmissions partially or fully overlaps with the coverage area of an ultra-reliable low latency communications network URLLC. In this sense, for example, the eMBB may neighbor the URLLC network.

In some embodiments, the eMBB and URLLC may operate on the same frequency or channel. In other embodiments, the eMBB URLLC may operate on different frequencies. Generally, the URLLC and eMBB may operate on any frequency combination for which interference may be observed by the URLLC. For example, cross link interference is seen in adjacent channels and thus the URLLC and eMBB networks may be co-channel or adjacent channel deployments.

Generally, the eMBB and URLLC networks may be operated by the same network operator or different network operators, as will be discussed in more detail below.

Figure 4:
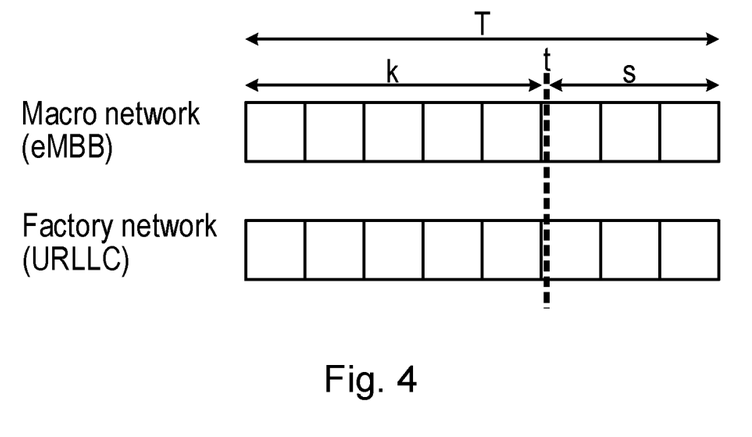
FIG. 4 illustrates a scheme for dividing up a time horizon according to some embodiments herein.

Turning to FIG. 4, FIG. 4 illustrates a framework for performing the method 300 according to some embodiments. In this embodiment, the time horizon is divided into time intervals or windows, each of size T. It is noted that a time interval may also be referred to at any point herein as a time window. Each time window is divided into two sub-windows of size k and s, respectively, as depicted in FIG. 4. The first sub-window stars at time instant (t−k) and ends at time instant t while the second starts at time instant t and ends at time instant (t+s).

At time t, the method 300 is performed. In such embodiments, over the period k, the node (e.g. macro base station) learns the historical URLLC activity and TDD pattern over time window (t−k; t). The step of predicting a TDD pattern may thus comprise predicting the TDD pattern over the interval (t;t+s).

Put another way, in some embodiments the step of predicting 302 a time division duplex, TDD, pattern for the URLLC based on historical URLLC TDD data may comprise predicting, at a time, t, the time division duplex, TDD, pattern for the URLLC over a future time interval, (t;t+s), wherein s comprises the duration of the future time interval. The prediction may be based on historical URLLC TDD data obtained in a past (e.g. previous) time interval (t−k;t), wherein k comprises the duration of the past time interval.

The node may obtain the historical URLLC TDD pattern (e.g. in some embodiments over the time window (t−k; t) as described above) as follows. As a first example, in some embodiments, the node may monitor the URLLC TDD pattern by performing or collecting measurements of interference from devices or user equipment (UEs) connected to the node e.g., by monitoring the interference level from the URLLC network on the macro UEs, the node may infer the TDD pattern of the URLLC network.

During deployment, the eMBB network can infer the URLLC TDD pattern over (t−k; t) based on the interference level on eMBB users surrounding the URLLC network (e.g. factory). For instance, the interference level on eMBB users close to a factory is higher in uplink when the URLLC is transmitting in the downlink compared to when the URLLC is also transmitting in the uplink. Furthermore, the interference level from URLLC on eMBB is proportionally mapped to the resource utilization of the URLLC network. It is noted that it may be desirable that macro cell transmissions be avoided during time periods when such measurements are performed on the URLLC network.

This embodiment may be relevant, for example, where the eMBB network and the URLLC network are operated by different network operators or vendors and information sharing between the operators is limited. In this manner the eMBB network may be able to infer a historical TDD pattern without receiving any information from the URLLC network.

As a second example, in some embodiments the URLLC network may signal its TDD pattern directly to the eMBB network. For example the URLLC network may send one or more signals to the macro network, the one or more signals comprising information about the historical load and/or TDD pattern of the URLLC. For example, the URLLC may provide such information about regarding the time interval (or window) (t−k; t).

In some embodiments, the URLLC network may provide, alternatively or additionally, an estimate of the expected load and TDD pattern for the coming time period. As such, the step 302 may comprise obtaining a prediction of a TDD pattern for the URLLC network from the URLLC network itself. Such embodiments may be possible in particular if the URLLC network belongs to the same operator as the macro network, which is relevant for many co-channel deployments between macro and local URLLC networks. For adjacent channel deployments, multiple operators may be involved and therefore the first example may be more convenient.

Based on the historical activity of the URLLC network in the step 302, the method comprises predicting 302 a time division duplex, TDD, pattern for the URLLC based on the historical URLLC TDD data. In some embodiments, this step comprises the node (e.g. macro BS(s)) predicting a future URLLC TDD pattern over a time window of (t; t+s).

In some embodiments, the step 302 may comprise predicting a sequence of actions. For example, a sequence of TDD patterns.

In some embodiments the prediction is made using a first trained model such as, for example, a model trained using a machine learning process. In some embodiments, the step of predicting may be performed using first model such as a trained neural network. In some examples, the first model may comprise a recurrent neural network (RNN). In one example, the first model may comprise a long short term memory (LSTM) cell. RNN are suitable for time-dependent data. RNN is suitable for the embodiments herein since a TDD pattern is a function of load and load can be characterized by a time series. For instance, the load level at t is a function of the load at t−1, t−2, t−3. There thus exhibits a time dependency.

The skilled person will be familiar with machine learning and neural networks, but in brief, neural networks are a type of supervised machine learning model that can be trained to predict a desired output for given input data. Neural networks are trained by providing training data comprising example input data and the corresponding "correct" or ground truth outcome that is desired. Neural networks comprise a plurality of layers of neurons, each neuron representing a mathematical operation that is applied to the input data. The output of each layer in the neural network is fed into the next layer to produce an output. For each piece of training data, weights associated with the neurons are adjusted until the optimal weightings are found that produce predictions for the training examples that reflect the corresponding ground truths.

The skilled person will appreciate however that neural networks are merely an example and that any model or prediction scheme that may be used to predict a URLLC TDD scheme could equally be used. Examples of other models include but are not limited to random forest models.

Generally, the method 300 may further comprise training a first model to predict the URLLC TDD pattern using a machine learning process. The first model may take as input one or more of: a time of day; a day of the week; a previous URLLC pattern; a URLLC load; and an estimate of a future load and/or TDD pattern provided by the URLLC network. Put another way, these may be input features or input parameters to the first model (or prediction scheme). The skilled person will appreciate that these are merely examples and that other inputs may also be provided to the first model.

Where the first model takes as input a previous URLLC pattern or a URLLC load, these may comprise the URLLC TDD pattern over the time interval k (e.g. the slots in the time interval (t–k;t) as described above.

In some embodiments, training the first model may comprise training the model on training data comprising i) example inputs and ii) corresponding ground truth URLLC TDD patterns. As an example, in an embodiment where the first model takes as input three input parameters comprising i) Time of Day, ii) "Actual URLLC Load in the time period (t–k;t) and iii) Estimated Future Load in the time period (t;t+s), the training data may be in the following format:

In terms of the schematic in FIG. 4, in some embodiments the step of predicting traffic load for the eMBB based on historical eMBB traffic load data may comprise predicting, at a time, t, traffic load for the eMBB over a future time interval, (t;t+s), wherein s comprises the duration of the future time interval. The prediction may be based on historical traffic load for the eMBB obtained in a past time interval (t–k;t), wherein k comprises the duration of the past time interval. Put another way, based on the historical activity of the eMBB users, each macro base station predicts the future traffic load of its associated users over a time window of (t; t+s).

In some embodiments the prediction of the eMBB load is made using a second trained model such as, for example, a model trained using a machine learning process. In some embodiments, the step of predicting traffic load for the eMBB based on historical eMBB traffic load data may be performed using a second model such as a trained neural network. In some examples, the second model may comprise a recurrent neural network. In one example, the first model may comprise a long short term memory (LSTM) cell.

| TimeOfDay | URLLCLoad(t – k; t) | EstimatedFutureLoad(t; t + s) | ActualURLLCTDDPATTERN(t; t + s) |
|---|---|---|---|
| 12:04:48 | 25, 25, 30, 40, 15 | 40, 10, 50, 5 | DUDU |
| 12:56:43 | 20, 15, 25, 15, 25 | 10, 40, 10, 5 | UDUU |

In such an example the field ActualURLLCTDDPATTERN(t;t+s) represents the ground truth, e.g. the TDD pattern that the URLLC network actually performed in the subsequent time period (t;t+s) for each example. In this example, the first model is thus trained to predict the field: ActualURLLCTDDPATTERN(t;t+s) from the input parameters: TimeOfDay, URLLCLoad(t–k;t) and EstimatedFutureLoad(t;t+s). In this example, the units of the URLLC Load and EstimatedFutureLoad are packets/s/m². k=5 and s=4 in the above example.

In some embodiments the method may comprise determining a ground truth URLLC TDD pattern based on interference experienced by the eMBB network from the URLLC network (as described above). This may be particularly relevant for compiling a training data set in embodiments where the URLLC and the eMBB networks are operated by different network operators where information sharing may be limited. Alternatively or additionally, the URLLC may directly signal the eMBB network with example inputs and ground truth outputs as described above. The method may therefore further comprise receiving a signal from the URLLC network comprising an indication of an example input and/or an example corresponding ground truth URLLC TDD pattern. This may be particularly relevant if the eMBB and URLLC networks are operated by the same operator and thus direct signalling may be more easily facilitated.

The skilled person will be familiar with methods of training a neural network using training data (e.g. gradient descent etc.) and appreciate that the training data may comprise many hundreds or thousands of rows of training data (depending on the accuracy required of the trained model), obtained in a diverse range of network conditions.

In some embodiments, the method 300 may further comprise predicting traffic load for the eMBB based on historical eMBB traffic load data. The step of scheduling 304 (as will be described in more detail below) may then comprise scheduling the eMBB TDD pattern based on the predicted URLLC TDD pattern and the predicted eMBB traffic load.

Neural networks were described above with respect to the first model and the details therein will be understood to apply equally to the second model. The skilled person will further appreciate that the second model may comprise any other type of model or prediction scheme suitable for predicting a future eMBB load based on historical eMBB traffic load information. Examples of other models include but are not limited to random forest models.

Generally, the method 300 may further comprise training the second model to predict the future eMBB load using a machine learning process.

The second model may take as input one or more of: a time of day; a day of the week; a historical traffic load of the node associated with the eMBB; and a historical traffic load associated with another node neighbouring the node associated with the eMBB. Put another way, these may be input features or input parameters to the second model (or prediction scheme). The skilled person will appreciate that these are merely examples and that other inputs may also be provided to the second model.

Where the second model takes as input a historical traffic load of the node associated with the eMBB or a historical traffic load associated with another node neighbouring the node associated with the eMBB, these may comprise historical traffic loads over the time interval k (e.g. the slots in the time interval (t-k;t) as described above.

In some embodiments, training the second model may comprise training the model on training data comprising i) example inputs and ii) corresponding ground truth eMBB traffic load information. Generally the node, in its capacity as scheduler of the eMBB transmissions, will be able to record its historic traffic load for use as training data. As an example, in an embodiment where the second model takes as input two input parameters comprising i) Time of Day, and ii) eMBB Load in the time period (t-k;t), the training data may be in the following format:

| TimeOfDay | eMBBLoad(t − k; t) | ActualeMBBLoad(t; t + s) |
|---|---|---|
| 12:04:48 | 100 Mbps/km$^2$ | 110 Mbps/km$^2$ |
| 12:56:43 | 90 Mbps/km$^2$ | 100 Mbps/km$^2$ |

In such an example the field ActualeMBBLoad(t;t+s) represents the ground truth, e.g. the eMBB load in the subsequent time period (t;t+s) for each example. In this example, the second model is thus trained to predict the field: ActualeMBBLoad(t;t+s) from the input parameters: TimeOfDay, and eMBBLoad(t−k;t). In the example above, k=1 and s=1. However, it will be appreciated that in other examples, a sequence of values may be provided as input and a sequence of future values may be predicted as output e.g., the input and outputs may be vectors and not scalars.

As noted above with respect to the first model, the skilled person will be familiar with methods of training a neural network using training data (e.g. gradient descent etc.) and appreciate that the training data may comprise many hundreds or thousands of rows of training data (depending on the accuracy required of the trained model), obtained in a diverse range of network conditions.

The first model (and the second model in embodiments where the second model is generated) may be trained according to data driven schemes during which a large amount of data traffic from the network is collected over multiple days. The node performing the method 300 (e.g. the macro base station) may be trained offline to learn to predict a future URLLC TDD pattern and/or the future eMBB load of its associated users using the first and/or second models over a time window of (t; t+s) respectively based on the respective considered input features.

The first model and/or second model may be periodically updated by performing further training and providing updates to the first and/or second models. Further training may be triggered, for example, by changes to the URLLC or eMBB network (e.g. new factory equipment, new macro base stations, changes in beamforming and the like). In this way, the model may be trained to respond to changes in the network conditions and thus the accuracy of the first and/or second models may be ensured over a longer period of time.

Turning back now to the method 300, after block 302 (e.g. after the TDD pattern for the URLLC is predicted), the method 300 moves on to block 304: scheduling an eMBB TDD pattern, based on the predicted URLLC TDD pattern, so as to manage cross-link interference on the URLLC network.

In this step, neighboring eMBB nodes to the URLLC (e.g. neighbouring macro base stations) adjust their corresponding TDD patterns over a time window of size s slots based on the predicted URLLC TDD pattern.

In embodiments where the eMBB traffic load is also predicted (as described above), the scheduling may be based on the predicted URLLC TDD pattern and the predicted eMBB traffic load over the time window (t; t+s). For example, at the time the eMBB TDD pattern may be scheduled by allocating future eMBB TDD patterns over the future time interval (t;t+s), based on both the predicted URLLC TDD pattern over the future time interval (t;t+s) and the predicted eMBB traffic load over the future time interval (t;t+s).

For example, the input to this step may comprise the predicted URLLC TDD pattern (from Step 302). In some embodiments, a predicted eMBB traffic load over time window (t; t+s) may also be input. In embodiments where the predicted eMBB traffic load over time window (t; t+s) is provided, this may be used to approximate the number of eMBB downlink TDD slots required for serving the predicted eMBB load over time window (t; t+s).

Generally, the cross-link interference may be managed by the eMBB network controlling the number of slots during which the eMBB is transmitting in the downlink and URLLC is transmitting in the uplink. Thus in some embodiments, the step of scheduling comprises minimising a number of slots in which the eMBB transmits in the downlink whilst the URLLC is predicted to transmit in the uplink; and/or minimising a number of slots in which the eMBB transmits in the uplink whilst the URLLC is predicted to transmit in the downlink. In this way cross-link interference is avoided wherever possible and thus the URLLC latency and reliability requirements may be guaranteed.

More generally, the step 304 of scheduling may comprise scheduling the eMBB TDD pattern so as to meet a service level requirement associated with the URLLC. For example, some eMBB downlink/uplink transmissions may be permitted in URLLC predicted uplink/downlink slots (respectively) so long as the interference caused is not significant enough to prevent the URLLC from meeting the service level requirements required of URLLC networks.

To this end, in some embodiments, the step of scheduling may comprise scheduling an eMBB uplink slot during a predicted URLLC uplink slot; or scheduling an eMBB downlink slot during a predicted URLLC downlink slot. In this way, cross link interference may be avoided in those slots. In some embodiments, cross-link interference may be substantially avoided by only scheduling eMBB uplink slots during predicted URLLC uplink slots and only scheduling eMBB downlink slots during predicted URLLC downlink slots.

Put another way, step 304 may comprise refraining from scheduling (e.g. not scheduling) eMBB downlink slots during predicted URLLC uplink slots and/or refraining from scheduling (e.g. not scheduling) eMBB uplink slots during predicted URLLC downlink slots.

In the above, it is assumed that the eMBB transmissions are entirely flexible and can thus be buffered wherever necessary in order to give preference to the URLLC transmissions. In some embodiments the step of scheduling may comprise scheduling an eMBB downlink slot during a predicted URLLC uplink slot or scheduling an eMBB uplink slot during a predicted URLLC downlink slot, (only) if required by the eMBB network to meet a service level requirement associated with the eMBB. In other words, in some embodiments, the eMBB may prioritise its traffic if buffering would lead the eMBB to fail to meet its own reliability or quality of service criteria. More generally therefore, the step of scheduling may comprise refraining from scheduling an eMBB slot during a predicted URLLC uplink or downlink slot, based on: an amount of downlink data in the buffer; a downlink latency requirement of the eMBB network; and/or an average bit rate requirements of the eMBB.

In another embodiment, the scheduling may be performed selectively, so that only traffic to devices with signal strength in range of the URLLC network may be scheduled as above, whilst traffic to devices not in range of the URLLC network may be treated normally. In other words, an eMBB uplink slot may be scheduled during a predicted URLLC downlink slot for a subset of devices connected to the eMBB network if the subset of devices are located such that the crosslink interference caused by uplink from the subset of devices on the downlink of the URLLC is below a threshold interference level. The threshold interference level may be set based on the signal strength of the subset of devices as measured in the URLLC network. Put another way, the URLLC network may measure the signal strength of the eMBB devices, and signal to the eMBB network if scheduling restrictions are needed (e.g, if the received signal strength exceeds the threshold interference level). Alternatively or additionally, eMBB devices can measure the signal strength from the URLLC, and report it back to the eMBB network, which may then take scheduling actions based on the threshold interference level. In some examples, the threshold interference level may be set so as to ensure a latency, reliability or other QoS criteria may be met by the URLLC network. The threshold interference level may also have been agreed between the eMBB network and the URLLC network.

To summarise, in a particular embodiment of the method 300, if the predicted URLLC TDD pattern is downlink for the next time slot, the eMBB transmits in the downlink if there is downlink data in the buffer. Alternatively, if there is no downlink data in the buffer, or if the downlink latency and the average bit rate requirements allow it, the eMBB network can either be silent, or schedule uplink transmissions from users located sufficiently far away from the URLLC network. The sub-group of users, which can be considered for uplink transmissions can for example be decided based on the signal strength received by the macro users from the URLLC network. In this embodiment, if the predicted URLLC TDD pattern is downlink for the next time slot, eMBB transmits in the downlink if there is downlink data in the buffer. Alternatively, if there is no downlink data in the buffer, or if the downlink latency and the average bit rate requirements allow it, the eMBB network can either be silent, or schedule uplink transmissions from users located sufficiently far away from the URLLC network. The sub-group of users, which can be considered for uplink transmissions can, for example, be decided based on the signal strength received by the macro users from the URLLC network.

In this way, the disclosures herein avoid scheduling cross-link (from macro downlink to URLLC uplink) interference as much as possible, i.e., when ever made possible by the load in the macro cells. The main motivation for this is that the eMBB traffic is typically more flexible or less latency critical compared to the URLLC traffic, so it is possible, for example, to buffer the data, or avoid utilizing all possible downlink slots for eMBB transmissions. Note that the gains from the proposed approach increase in scenarios of low eMBB load.

Turning now to other embodiments, if the eMBB node (e.g. macro base station) is applying beamforming, the above described embodiments may be enhanced by only avoiding transmitting some downlink beams during slots whereby the predicted URLLC TDD pattern is uplink. In general, only beams that are sufficiently strong within the coverage area of the URLLC network, e.g. exceeding a predefined threshold signal strength, may be classified as interfering beams, subject to scheduling restrictions. At the same time, beams having a signal strength below such a threshold signal strength may be scheduled normally. In more detail, the set of interfering beams can for example consist of the beams pointing from the macro base station towards the local URLLC network, or beams that are serving macro users located close to the URLLC network, or beams which can measure the highest level of interference coming from the URLLC network. Alternatively, the URLLC network and/or devices connected to the URLLC network can measure and detect beams transmitted by the overlapping macro cells, and inform the macro network about the detected beams and their signal strengths. Yet another alternative is to perform an initial analysis of interfering beams during the planning or tuning phases of the network deployment, and then to refine the classification of interfering beams during the operation phase of the networks.

In summary, where the node applies beamforming the step of scheduling 304 may comprise scheduling the eMBB TDD pattern of beams overlapping a coverage area of the URLLC with a strength above a threshold signal strength, based on the predicted URLLC TDD pattern. E.g. in order to manage cross-link interference between the overlapping beams and the URLLC network.

Turning now to other embodiments, the embodiments above assume that (or provide optimal results when) the eMBB network and the URLLC network employ the same numerology and apply slot-based scheduling, e.g. if the slot length (and transmission time interval, TTI) is the same for both networks. However this isn't necessarily the case. If the two networks employ different numerologies or perform sub-slot scheduling then the slots or sub-slots may not necessarily align.

For example, consider a scenario where an eMBB network follows the 'normal' scheme with "Transmission time interval, TTI=slot=14 symbols", but a URLLC factory network is following a "sub-slot scheduling" scheme, where the TTI is less than a slot, i.e., less than 14 symbols. For example, one slot of 14 symbols can contain 4 symbols for downlink (downlink sub-slot), 4 symbols for uplink (uplink sub-slot), and 6 guard symbols, (or similar). For this case, the networks are not generally "synchronized" (e.g., the TTIs do not align). The skilled person will appreciate that this is merely an example however and that other combinations of numerologies, slot and sub-slot scheduling may lead to unsynchronized slots/sub-slots.

Generally therefore, if the networks are using different numerologies, or if the URLLC network is applying sub-slot scheduling, the networks will have different TTI lengths.

In some embodiments, if the TTI lengths are different then the method 300 may further comprise adjusting one or other of the TTIs (e.g. the TTI of the URLLC network or the eMBB network) such that the TTIs are made equal, before the proposed mechanisms described above with respect to FIG. 3 are applied to manage cross-link interference. For example, the TTI length of the eMBB transmissions may be adjusted to match the TTI length of the URLLC network.

In more detail, in some embodiments the step of scheduling (304) may comprise adjusting a numerology associated with the TDD pattern of the eMBB network so as to synchronise at least one slot in the TDD pattern of the eMBB network with at least one slot in the TDD pattern of the URLLC network. Put another way, the eMBB network may change to the same numerology as the URLLC network.

In some embodiments, the step of scheduling (304) may comprise adjusting a sub-slot scheduling scheme of the eMBB network so as to synchronise at least one slot or sub-slot in the TDD pattern of the eMBB network with at least one slot or sub-slot in the TDD pattern of the URLLC network. As an example, the eMBB network may apply the same sub-slot scheduling scheme as the URLLC network.

In some embodiments, the step of scheduling (304) may comprise leaving at least one slot or sub-slot of the eMBB TDD pattern unutilised (e.g. blank) so as to manage cross-link interference on a slot or sub-slot of the URLLC TDD pattern. Put another way, the eMBB may "blank" parts of the (downlink) slots. For example, the eMBB may blank the eMBB symbols that overlap with URLLC slots or sub-slots that may otherwise experience cross-link interference (e.g. that we want to protect).

In summary, embodiments herein propose a) a mechanism to predict URLLC TDD patterns (TDD pattern consisting of either slots or sub-slots depending on the URLLC scheduling scheme), b) a mechanism to manipulate (or apply scheduling restrictions for) eMBB TDD patterns (TDD pattern consisting of either slots or sub-slots) to avoid cross-link interference, c) a mechanism to "blank" some symbols of the eMBB slots to avoid cross-link interference (TDD pattern consisting of slots, but with blanked symbols).

Figure 5:
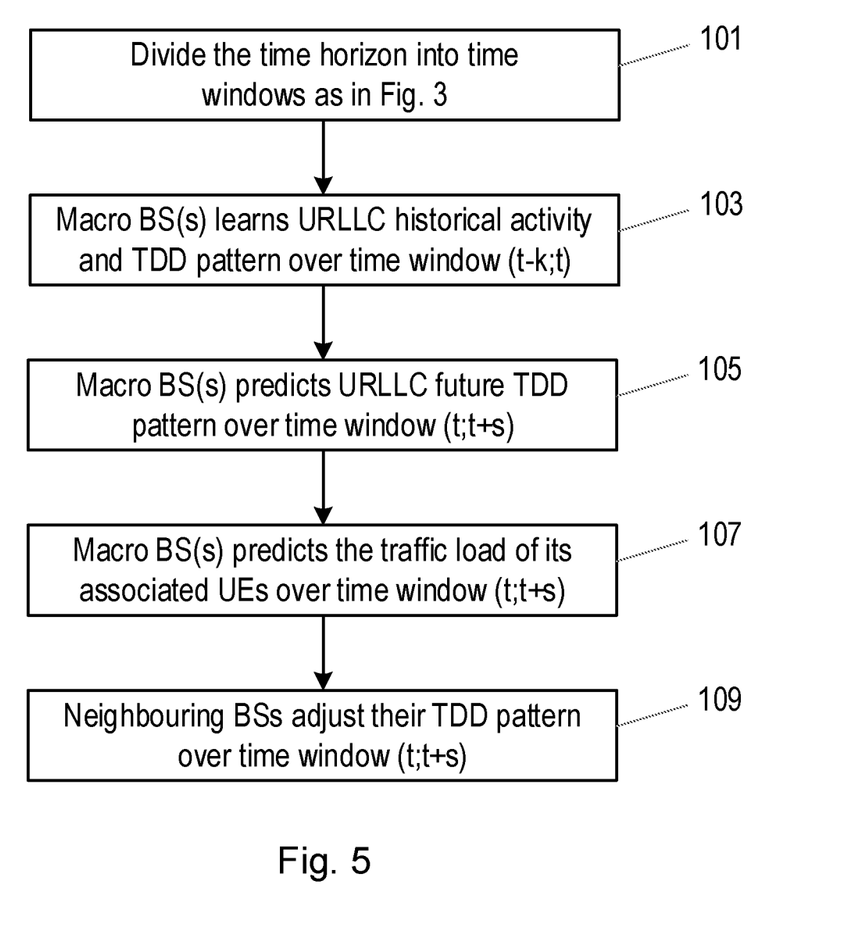
FIG. 5 illustrates a method according to some embodiments herein.

Turning now to FIG. 5 which shows a method 500 according to some embodiments herein. In this embodiment the node comprises a base station in a macro network (e.g. a macro base station) and the URLLC network comprises a factory network or similar. In a first block 502, the method comprises dividing the time horizon into windows T comprising sub-windows (t−k;t) and (t;t+s) as described above with respect to FIG. 4. In a block 504 the node learns the historical URLLC activity and TDD pattern over the time window (t−k;t). The method then comprises predicting 302; 506 a time division duplex, TDD, pattern for the URLLC based on the historical URLLC TDD data, over the time window (t;t+s). Predicting a URLLC TDD pattern in this way was described above with respect to block 302 of the method 300 and the detail therein will be understood to apply equally to the block 506.

In block 508 the method comprises the macro base station predicting its future traffic load, e.g. the traffic load of its associated UEs over the future time window (t;t+s). Predicting the eMBB traffic load was described above with respect to the method 300 and the detail therein will be understood to apply equally to block 508 of the method 500.

In block 510 the method comprises adjusting or scheduling the TDD pattern of one or more neighbouring base stations over a time interval (t;t+s) in order to manage the cross-link interference experienced by the URLLC factory network. As described above, the scheduling is performed based on the predicted URLLC TDD pattern and the predicted eMBB load. In this way cross-link interference may be managed and reduced to levels that ensure the latency and reliability requirements of the URLLC network may be met.

Figure 6:
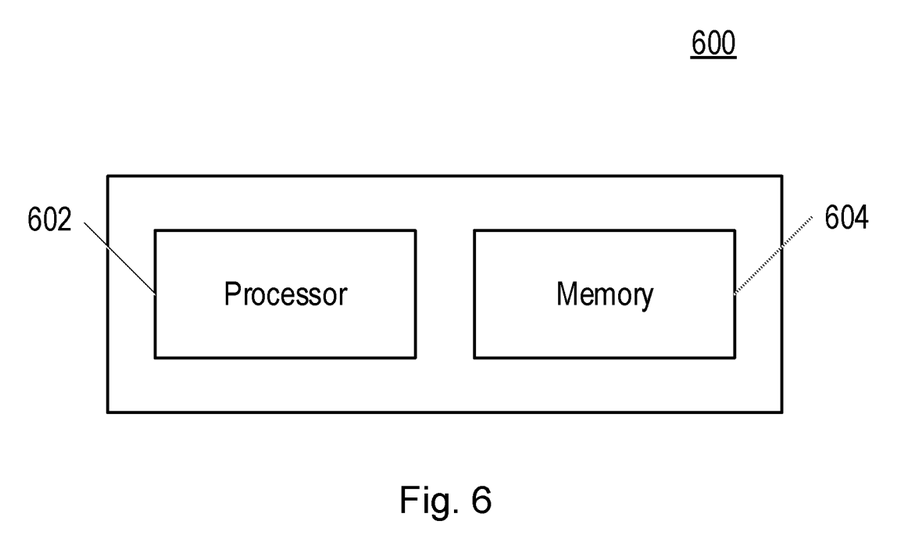
FIG. 6 illustrates a node according to some embodiments herein.

Turning now to other embodiments, as illustrated in FIG. 6, in some embodiments there is a node 600 in a communications network according to some embodiments herein. The node 600 is configured (e.g. adapted or programmed) to perform any of the embodiments of the method 300 and/or the method 500 as described above.

Generally, the node 600 may comprise any component or network function (e.g. any hardware or software module) in the communications network suitable for performing the functions described herein. For example, a node may comprise equipment capable, configured, arranged and/or operable to communicate directly or indirectly with a UE (such as a wireless device) and/or with other network nodes or equipment in the communications network to enable and/or provide wireless or wired access to the UE and/or to perform other functions (e.g., administration) in the communications network. Examples of nodes include, but are not limited to, access points (APs) (e.g., radio access points), base stations (BSs) (e.g., radio base stations, Node Bs, evolved Node Bs (eNBs) and NR NodeBs (gNBs)). Further examples of nodes include but are not limited to core network functions such as, for example, core network functions in a Fifth Generation Core network (5GC).

The node 600 may be configured or operative to perform the methods and functions described herein, such as embodiments of the method 300 or the method 500 as described above. The node 600 may comprise processing circuitry (or logic) 602. It will be appreciated that the node 600 may comprise one or more virtual machines running different software and/or processes. The node 600 may therefore comprise one or more servers, switches and/or storage devices and/or may comprise cloud computing infrastructure or infrastructure configured to perform in a distributed manner, that runs the software and/or processes.

The processor 602 may control the operation of the node 600 in the manner described herein. The processor 602 can comprise one or more processors, processing units, multi-core processors or modules that are configured or programmed to control the node 600 in the manner described herein. In particular implementations, the processor 602 can comprise a plurality of software and/or hardware modules that are each configured to perform, or are for performing, individual or multiple steps of the functionality of the node 600 as described herein.

The node 600 may comprise a memory 604. In some embodiments, the memory 604 of the node 600 can be configured to store program code or instructions that can be executed by the processor 602 of the node 600 to perform the functionality described herein. Alternatively or in addition, the memory 604 of the node 600, can be configured to store any requests, resources, information, data, signals, or similar that are described herein. The processor 602 of the node 600 may be configured to control the memory 604 of the node 600 to store any requests, resources, information, data, signals, or similar that are described herein.

It will be appreciated that the node 600 may comprise other components in addition or alternatively to those indicated in FIG. 6. For example, in some embodiments, the node 600 may comprise a communications interface. The communications interface may be for use in communicating with other nodes in the communications network, (e.g. such as other physical or virtual nodes). For example, the communications interface may be configured to transmit to and/or receive from other nodes or network functions requests, resources, information, data, signals, or similar. The processor 602 of node 600 may be configured to control such a communications interface to transmit to and/or receive from other nodes or network functions requests, resources, information, data, signals, or similar.

Generally, the node 600 is for (e.g. configured or suitable for) scheduling enhanced mobile-broadband, eMBB, transmissions. In scenarios where the coverage area of the eMBB cell or beam interferes with an ultra-reliable low latency communication network, URLLC, the node may be configured to schedule eMBB transmissions in such a manner as to manage cross-link interference on the URLLC network.

Briefly, in one embodiment, the node 600 may be configured to predict a time division duplex, TDD, pattern for the URLLC based on historical URLLC TDD data. The node 600 may further be configured to schedule an eMBB TDD pattern, based on the predicted URLLC TDD pattern, so as to manage cross-link interference on the URLLC network.

Predicting a time division duplex, TDD, pattern for the URLLC based on historical URLLC TDD data was described in detail with respect to the method 300 in block 302 and the detail therein will be appreciated to apply equally to embodiments of the node 600.

Scheduling an eMBB TDD pattern, based on the predicted URLLC TDD pattern, so as to manage cross-link interference on the URLLC network was also described in detail with respect to the method 300 in block 304 and the detail therein will be appreciated to apply equally to embodiments of the node 600.

In some embodiments, for example, the processor is further caused to: predict traffic load for the eMBB based on historical eMBB traffic load data; and schedule the eMBB TDD pattern based on the predicted URLLC TDD pattern and the predicted eMBB traffic load.

In this way a node is provided that is capable of managing the cross-link interference on a URLLC network such that the URLLC network may meet its reliability and QoS requirements and thus facilitate emerging technologies that require low latency and extremely high reliability communications.

In another embodiment, there is provided a computer program product comprising a computer readable medium, the computer readable medium having computer readable code embodied therein, the computer readable code being configured such that, on execution by a suitable computer or processor, the computer or processor is caused to perform any of the embodiments of methods described herein, such as embodiments of the method 300 and/or the method 500.

Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method in a node of a communications network for scheduling enhanced mobile-broadband (eMBB) transmissions, wherein the eMBB coverage area interferes with an ultra-reliable low latency communication (URLLC) network, the method comprising:
predicting a time division duplex (TDD) pattern for the URLLC based on historical URLLC TDD data; and
scheduling an eMBB TDD pattern, based on the predicted URLLC TDD pattern, so as to manage cross-link interference on the URLLC network, wherein said scheduling comprises leaving at least one slot or symbol of the eMBB TDD pattern unutilized so as to manage cross-link interference on a slot or sub-slot of the URLLC.

2. The method of claim 1, further comprising:
predicting traffic load for the eMBB based on historical eMBB traffic load data; and
wherein the step of scheduling comprises scheduling the eMBB TDD pattern based on the predicted URLLC TDD pattern and the predicted eMBB traffic load.

3. The method of claim 1, wherein the step of predicting a time division duplex (TDD) pattern for the URLLC network based on historical URLLC TDD data comprises predicting, at a time, t, the time division duplex (TDD) pattern for the URLLC over a future time interval, (t;t+s), wherein s comprises the duration of the future time interval and wherein the prediction is based on historical URLLC TDD data obtained in a past time interval (t−k;t), wherein k comprises the duration of the past time interval.

4. The method of claim 3, wherein the step of scheduling an eMBB TDD pattern comprises:
at the time t, allocating future eMBB TDD patterns over the future time interval (t;t+s), based on the predicted URLLC TDD pattern over the future time interval (t;t+s) and the predicted eMBB traffic load over the future time interval (t;t+s).

5. The method of claim 1, wherein the step of scheduling comprises:
scheduling the eMBB TDD pattern so as to meet a service level requirement associated with the URLLC.

6. The method of claim 1, wherein the step of scheduling comprises:
minimizing a number of slots in which the eMBB transmits in the downlink while the URLLC is predicted to transmit in the uplink; and/or
minimizing a number of slots in which the eMBB transmits in the uplink while the URLLC is predicted to transmit in the downlink.

7. The method of claim 1, wherein the step of scheduling comprises:
scheduling an eMBB uplink slot during a predicted URLLC uplink slot; or
scheduling an eMBB downlink slot during a predicted URLLC downlink slot.

8. The method of claim 1, wherein the step of scheduling comprises:
 refraining from scheduling an eMBB downlink slot during a predicted URLLC uplink slot; or
 scheduling an eMBB downlink slot during a predicted URLLC uplink slot only if required by the eMBB network to meet a service level requirement associated with the eMBB.

9. The method of claim 1, wherein the step of scheduling comprises:
 scheduling an eMBB uplink slot during a predicted URLLC downlink slot for a subset of devices connected to the eMBB network, wherein the subset of devices are located such that the crosslink interference caused by uplink from the subset of devices on the downlink of the URLLC is below a threshold interference level, and
 wherein the threshold interference level is set based on the signal strength of the subset of devices as measured in the URLLC network.

10. The method of claim 1, wherein the step of scheduling comprises:
 refraining from scheduling an eMBB slot during a predicted URLLC uplink or downlink slot, based on:
  an amount of downlink data in the buffer;
  a downlink latency requirement of the eMBB network; and/or
  an average bit rate requirements of the eMBB.

11. The method of claim 1, wherein the node applies beamforming; and wherein the step of scheduling comprises:
 scheduling the eMBB TDD pattern of beams overlapping a coverage area of the URLLC with a strength above a threshold signal strength, based on the predicted URLLC TDD pattern.

12. The method of claim 1, wherein the step of scheduling comprises:
 adjusting a numerology associated with the TDD pattern of the eMBB so as to synchronize at least one slot in the TDD pattern of the eMBB with at least one slot in the TDD pattern of the URLLC; or
 adjusting a sub-slot scheduling scheme of the eMBB so as to synchronize at least one slot or sub-slot in the TDD pattern of the eMBB with at least one slot or sub-slot in the TDD pattern of the URLLC.

13. The method of claim 1, wherein the step of predicting comprises:
 training a first model to predict the URLLC TDD pattern using a machine learning process.

14. The method of claim 13, wherein the first model takes as input one or more of:
 a time of day;
 a day of the week;
 a previous URLLC pattern;
 a URLLC load; and
 an estimate of a future load and/or TDD pattern provided by the URLLC network.

15. The method of claim 13, wherein training the first model comprises training the model on training data comprising i) example inputs and ii) corresponding ground truth URLLC TDD patterns.

16. The method of claim 15, further comprising:
 determining a ground truth URLLC TDD pattern based on interference experienced by the eMBB network from the URLLC network, or -receiving a signal from the URLLC network, the signal comprising an indication of an example input and/or an example corresponding ground truth URLLC TDD pattern.

17. The method of claim 2, wherein the step of predicting traffic load for the eMBB comprises training a second model to predict the traffic load for the eMBB using a machine learning process.

18. A node in a communications network, wherein the node is configured for enhanced mobile-broadband (eMBB) transmission with a coverage area that interferes with an ultra-reliable low latency communication network (URLLC), wherein the node comprises:
 a memory comprising instruction data representing a set of instructions; and
 a processor configured to communicate with the memory and to execute the set of instructions, wherein the set of instructions are configured to, when executed by the processor, cause the processor to:
  predict a time division duplex (TDD) pattern for the URLLC based on historical URLLC TDD data; and
  schedule an eMBB TDD pattern, based on the predicted URLLC TDD pattern, so as to manage cross-link interference on the URLLC network and so as to leave at least one slot or symbol of the eMBB TDD pattern unutilized to manage cross-link interference on a slot or sub-slot of the URLLC.

19. A node as in claim 18, wherein the set of instructions are further configured to cause the processor to:
 predict traffic load for the eMBB based on historical eMBB traffic load data; and
 wherein being caused to schedule comprises the processor being caused to schedule the eMBB TDD pattern based on the predicted URLLC TDD pattern and the predicted eMBB traffic load.

20. A node as in claim 18, wherein the set of instructions are further configured to cause the processor to predict the time division duplex (TDD) pattern for the URLLC network based on historical URLLC TDD data by predicting, at a time, t, the time division duplex (TDD) pattern for the URLLC over a future time interval, (t;t+s), wherein s comprises the duration of the future time interval and wherein the prediction is based on historical URLLC TDD data obtained in a past time interval (t−k;t), wherein k comprises the duration of the past time interval.

21. A method in a node of a communications network for scheduling enhanced mobile-broadband (eMBB) transmissions, wherein the eMBB coverage area interferes with an ultra-reliable low latency communication (URLLC) network, the method comprising:
 predicting a time division duplex (TDD) pattern for the URLLC based on historical URLLC TDD data; and
 scheduling an eMBB TDD pattern, based on the predicted URLLC TDD pattern, so as to manage cross-link interference on the URLLC network,
wherein the step of scheduling comprises minimizing a number of slots in which the eMBB transmits in the downlink while the URLLC is predicted to transmit in the uplink, and/or minimizing a number of slots in which the eMBB transmits in the uplink while the URLLC is predicted to transmit in the downlink.

* * * * *